US008000520B2

(12) United States Patent
Chang et al.

(10) Patent No.: US 8,000,520 B2
(45) Date of Patent: Aug. 16, 2011

(54) APPARATUS AND METHOD FOR TESTING IMAGE SENSOR WAFERS TO IDENTIFY PIXEL DEFECTS

(75) Inventors: Chia-Lun Chang, Sunnyvale, CA (US);
Chih-huei Wu, San Jose, CA (US);
John T. Yue, Los Altos, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 930 days.

(21) Appl. No.: 11/946,265

(22) Filed: Nov. 28, 2007

(65) Prior Publication Data

US 2009/0135414 A1   May 28, 2009

(51) Int. Cl.
*G06K 9/00*   (2006.01)
*G01N 21/00*  (2006.01)
*H04N 17/00*  (2006.01)
*H04N 17/02*  (2006.01)
*G01C 25/00*  (2006.01)

(52) U.S. Cl. ............ 382/149; 356/237.5; 348/187; 702/116

(58) Field of Classification Search .......... 382/141, 382/145, 149, 209, 217–221; 348/187–189, 348/246, 247; 356/237.5; 702/116, 117
See application file for complete search history.

(56) References Cited

U.S. PATENT DOCUMENTS

| | | | |
|---|---|---|---|
| 6,625,558 B1 * | 9/2003 | Van Ausdall et al. | 702/117 |
| 7,103,208 B2 * | 9/2006 | Wengender et al. | 382/141 |
| 7,136,157 B2 * | 11/2006 | Gomm et al. | 356/237.1 |
| 7,251,576 B2 * | 7/2007 | Su et al. | 702/117 |
| 2001/0036305 A1 * | 11/2001 | Jun | 382/149 |
| 2008/0266400 A1 * | 10/2008 | Lu et al. | 348/187 |
| 2009/0096873 A1 * | 4/2009 | Hennes et al. | 348/187 |

* cited by examiner

*Primary Examiner* — Michael A Lyons
(74) *Attorney, Agent, or Firm* — Lathrop & Gage LLP

(57) ABSTRACT

An image sensor testing apparatus is disclosed. The image sensor testing apparatus includes an electronic test system having a light source for illuminating an image sensor wafer to generate pixel data and a host processor for receiving the pixel data. An interface card coupled to the electronic test system has a programmable processor for processing the pixel data to generate processed data, the processed data transmitted to and analyzed by the host processor together with the pixel data to detect pixel defects in the image sensor wafer.

25 Claims, 3 Drawing Sheets

APPARATUS AND METHOD FOR TESTING IMAGE SENSOR WAFERS TO IDENTIFY PIXEL DEFECTS

BRIEF DESCRIPTION OF THE INVENTION

This invention relates generally to the testing of image sensors. More particularly, this invention relates to an apparatus and method for testing image sensor wafers to identify pixels defects such as blemish defects prior to integrating the image sensor wafers into image sensor devices.

BACKGROUND OF THE INVENTION

Image sensors are semiconductor devices that capture and process light into electronic signals for forming still images or video. Their use has become prevalent in a variety of consumer, industrial, and scientific applications, including digital cameras and camcorders, hand-held mobile devices, webcams, medical applications, automotive applications, games and toys, security and surveillance, pattern recognition, and automated inspection, among others. The technology used to manufacture image sensors has continued to advance at a rapid pace.

There are two main types of image sensors available today: Charge-Coupled Device ("CCD") sensors and Complementary Metal Oxide Semiconductor ("CMOS") sensors. In either type of image sensor, a light gathering photosite is formed on a semiconductor substrate and arranged in a two-dimensional pixel array. The photosites, generally referred to as picture elements or "pixels," convert the incoming light into an electrical charge. The number, size, and spacing of the pixels determine the resolution of the images generated by the sensor.

Modern image sensors typically contain millions of pixels in the pixel array to provide high-resolution images. The electronic signals representing the image information captured in each pixel are transmitted to an Image Signal Processor ("ISP") or other Digital Signal Processor ("DSP") where they are converted into digital signals and processed to generate a digital image.

The quality of the digital images generated by an image sensor depends mostly on its sensitivity and a host of other factors, such as lens-related factors (flare, chromatic aberration), signal processing factors, system control-related factors (focusing and exposure error), time and motion factors, and other semiconductor-related factors (dark currents, blooming, and pixel defects.) In particular, pixel defects can easily deteriorate image quality if not accounted for. Too many pixel defects can affect image quality even if corrected.

Most pixel defects are introduced during the manufacturing of an image sensor wafer. As with any semiconductor manufacturing process, the manufacturing of an image sensor is not defect-free. The manufacturing process for producing image sensor wafers is similar to those used for devices such as flash memories and DRAM. However, because image sensors have a light-sensitive surface, defects that might not affect a purely electronic device can render an image sensor wafer useless.

Defects acquired during the manufacturing process of an image sensor wafer may be smaller or larger than a pixel. Some defects may cause a pixel or pixels to not function entirely. Others may only degrade pixel performance slightly or degrade it under dynamic operation or under stress conditions such as increased temperature. Other defects may affect a pixel and its neighbors and not be identifiable through a comparison of adjacent pixel responses. It may also be that illumination falling on a pixel does not produce the expected response. These defects may be caused by noise or fabrication errors, including dust particles, scratches, high leakage, circuit defects, color filter non-uniformity, microlens defects, and the like.

There are three main types of pixel defects: stuck high, stuck low, and abnormal sensitivity or blemish defects. A stuck high defect occur when the underlying pixel produces a high or near full scale output (i.e., white) regardless of the incident light intensity. Conversely, a stuck low defect occur when the underlying pixel produces a low or near zero output (i.e., black) regardless of the incident light intensity. Abnormal sensitivity or blemish defects occur when the underlying pixel produces an output that is different than a normal pixel when exposed to the same lighting conditions. These are harder to detect as the difference in the output value may be small.

Pixel defects may be detected with several techniques. The most common ones involve inspecting or testing image sensor wafers at the fabrication facility before the image sensor wafers are packaged into an image sensor device. These techniques make use of semiconductor testing equipment traditionally used to test semiconductor wafers or specifically designed to test image sensor wafers, including Automatic Test Equipment ("ATE") systems provided by a variety of suppliers. Some of these ATE systems are capable of testing many image sensor wafers simultaneously.

Examples of ATE systems for testing image sensor wafers include the IP750EP test system provided by Teradyne, Inc., of North Reading, Mass., the T6171 system provided by Advantest America Corporation, of Santa Clara, Calif., the V93000 System-On-Chip ("SOC") test system provided by Verigy, Inc., of Cupertino, Calif., and the Magnum iCP test system provided by Nextest Systems Corporation, of San Jose, Calif. The Magnum iCP test system, for example, may test up to forty image sensor wafers simultaneously.

Each image sensor wafer is tested under various illumination conditions to evaluate the image sensor wafer's response. A host processor is connected to each image sensor wafer by means of an interface, which includes a probe card mounted on a load board. The output of the image sensor wafers are sent to the host processor for analysis. The host processor typically contains a library of testing routines, including image processing routines, to evaluate the output of the image sensor wafers and detect defects.

Common tests include generating a series of bright and dark images at different resolutions to evaluate whether the Digital Number ("DN") of each pixel in a given image sensor wafer corresponds to the correct amount of incident light. For example, a DN of 0 corresponds to a dark image (black) and a DN of 255 corresponds to a bright image (white). A wafer without any defects produces the same DN for each pixel when presented with a uniform light.

These and other currently-available ATE systems are typically intended for high-throughput, high-speed volume testing of image sensor wafers. As such, they may overlook subtle defects that cannot be detected until after assembly. The image processing routines in the host processor, for example, are not in general implemented with the goal of detecting small pixel defects such as blemish defects in the image sensor wafers being tested. Detecting subtle defects requires generating higher-resolution images, but at almost the same speed used for lower-resolution tests. These testers may not, for example, be able to identify subtle blemish defects that occur when uniform light incident on a given wafer fails to produce a uniform response across all pixels.

When that occurs, a defective image sensor wafer may be packaged into an image sensor device, thereby causing the device to be potentially rejected during testing by the device manufacturer or even later by a user of the device after its purchase. The cost incurred to the image sensor manufacturer, imaging device manufacturer, and eventually user, may be much larger than if the defect had been identified at an earlier stage of the manufacturing process, i.e., prior to packaging the image sensor wafer into the image sensor device.

Defects that are still present after an image sensor wafer has been packaged into an image sensor device can be detected with the use of software-based techniques, such as, for example, those described in U.S. Pat. Nos. 7,199,824 and 7,103,208. These techniques involve the use of an image processing unit coupled to the image sensor device to evaluate its response.

In U.S. Pat. No. 7,199,824, the output of each pixel and its surrounding, neighborhood pixels are examined. Pixels that differ by more than pre-determined thresholds from their surrounding pixels are determined to be defective. The defective pixels are then replaced with a value derived from their surrounding pixels.

In U.S. Pat. No. 7,103,208, an image of a predetermined scene is captured by the image sensor device and processed by a processor coupled to the device to identify defects. The defects are identified by a series of image processing functions, including applying an edge detector to enhance the edges in the captured image. The image sensor device is cleaned between two passes of the image processing functions to eliminate any defects detected due to dirt in the transmissive surface of the device.

An alternative provided in U.S. Pat. No. 7,209,168 integrates a pixel detection and correction mechanism in the image sensor package itself at the expense of higher packaging and processing costs. With device manufacturers pushing for lower costs and higher quality, there is a need to find as many defects and as early as possible in the assembly process of an image sensor device. Information about defects identified early in the assembly process can more quickly result in preventive measures.

Accordingly, it would be desirable to provide an apparatus and method for testing image sensor wafers that are capable of identifying pixel defects prior to packaging the image sensor wafers into image sensor devices. In particular, it would be desirable to provide an image sensor testing apparatus and method that can identify various pixel defects without sacrificing testing speed and throughput.

SUMMARY OF THE INVENTION

The invention includes an image sensor testing apparatus. The image sensor testing apparatus includes an electronic test system having a light source for illuminating an image sensor wafer to generate pixel data and a host processor for receiving the pixel data. An interface card coupled to the electronic test system has a programmable processor for processing the pixel data to generate processed data. The processed data is transmitted to and analyzed by the host processor together with the pixel data to detect pixel defects in the image sensor wafer.

An embodiment of the invention includes a method for conducting a dual-pass test of an image sensor wafer. A first pass test is conducted on the image sensor wafer to generate pixel data from an optical image. A second pass test is conducted on the image sensor wafer to process the pixel data in an interface card coupled to the image sensor wafer to generate processed data. The pixel data and the processed data are analyzed in an electronic test system coupled to the interface card to detect pixel defects in the image sensor wafer.

Another embodiment of the invention includes a method for testing an image sensor wafer. The image sensor wafer is illuminated with a plurality of light intensities to generate a plurality of pixel data sets. The plurality of pixel data sets is transmitted to an electronic test system. At least one pixel data set from the plurality of pixel data sets is processed in an interface card coupled to the electronic test system to generate a processed data set. The processed data set is transmitted to the electronic test system. The pixel data set and the processed data set are analyzed in the electronic test system to detect pixel defects in the image sensor wafer.

A further embodiment of the invention includes an interface card for use in an electronic test system for testing an image sensor wafer. The interface card has a programmable processor with image processing routines and a switch for switching between first and second testing paths, the first testing path connecting the image sensor wafer directly to the electronic test system to provide pixel data from the image sensor wafer to the electronic test system and the second testing path connecting the image sensor wafer to the processor to provide processed data to the electronic test system.

BRIEF DESCRIPTION OF THE DRAWINGS

The invention is more fully appreciated in connection with the following detailed description taken in conjunction with the accompanying drawings, in which like reference characters refer to like parts throughout, and in which.

DETAILED DESCRIPTION OF THE INVENTION

An image sensor testing apparatus for testing image sensor wafers for pixel defects is provided. An image sensor, as generally used herein, may be a semiconductor circuit having an array of pixels for capturing and processing an optical image into electronic signals in the form of pixel data. The apparatus includes an electronic test system having a circuit board for testing image sensor wafers. The electronic test system may include an Automatic Test Equipment ("ATE") system or any other testing system capable of testing image sensor wafers. The circuit board may be a load board or Device Under Test ("DUT") board for interfacing an image sensor wafer to the test head of the electronic test system.

According to an embodiment of the invention, the image sensor testing apparatus also includes an interface card. The interface card may be a probe card mounted on the circuit board for providing an electrical interface between the image sensor wafer being tested and the electronic test system. In one embodiment, the interface card has a switch for switching between two testing paths. The first testing path connects the image sensor wafer directly to the electronic test system to provide pixel data from the image sensor wafer to the electronic test system. The second testing path connects the image sensor wafer to a programmable processor in the interface card, where pixel data is processed to generate processed data. The processed data is sent to the electronic test system where it is analyzed together with the pixel data to identify pixel defects in the image sensor wafer being tested.

As generally used herein, a pixel defect may be any abnormality in a pixel of an image sensor wafer that causes the pixel to produce an unexpected response. Examples of pixel defects include stuck high, stuck low, and blemish defects as described above. According to an embodiment of the invention, pixel defects are detected in image sensor wafers without major sacrifices in testing speed and throughput.

Figure 1:
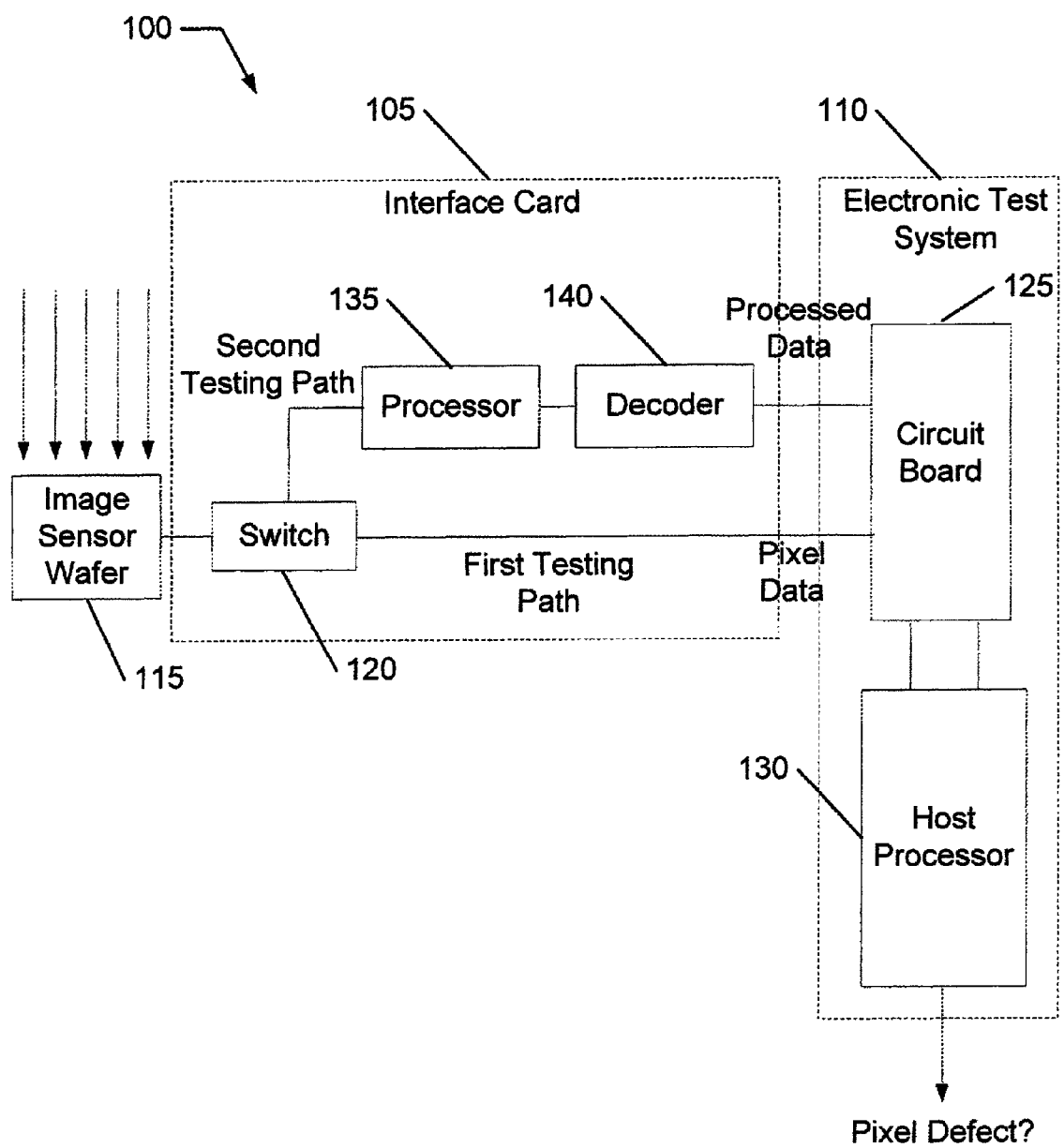
FIG. 1 illustrates an image sensor testing apparatus constructed according to an embodiment of the invention.

An image sensor testing apparatus constructed according to an embodiment of the invention is illustrated in FIG. 1. Image sensor testing apparatus 100 includes interface card 105 coupled to electronic test system 110 for testing image sensor wafer 115 for pixel defects. In one embodiment, interface card 105 may be a probe card for electrically interfacing image sensor wafer 115 with electronic test system 110. In this embodiment, electronic test system 110 may be an Automatic Test Equipment ("ATE") system for testing image sensor wafers such as image sensor wafer 115.

It is appreciated by one of ordinary skilled in the art that image sensor wafer 115 may be mounted onto interface card 105. Interface card 105, in turn, may be mounted onto circuit board 125 of electronic test system 110.

According to an embodiment of the invention, testing of image sensor wafer 115 may be conducted in two passes. In both passes, image sensor wafer 115 is illuminated with light at different wavelengths to generate pixel data corresponding to the incident light. In one embodiment, the light illuminating image sensor wafer 115 originates at a light source (not shown) that is part of electronic test system 110. A switch 120 in interface card 105 provides the electrical connections required for the two passes.

In the first testing pass, switch 120 connects image sensor wafer 115 directly to circuit board 125 in electronic test system 110. The pixel data is transmitted from image sensor wafer 115 to circuit board 125 and to host processor 130 coupled to circuit board 125 in electronic system 110, where it is analyzed for pixel defects.

In the second testing pass, switch 120 connects image sensor wafer 115 to programmable processor 135 in interface card 105 where the pixel data from image sensor wafer 115 is processed to generate processed data. The processed data is decoded by decoder 140 and transmitted to host processor 130 via circuit board 125 in electronic system 110, where, together with the pixel data from the first testing pass, it is analyzed for pixel defects.

The processing performed in processor 135 invokes image processing routines to facilitate the detection of pixel defects in image sensor wafer 115. In one embodiment, the image processing routines may include filtering routines, edge enhancement routines, and contrast enhancement routines to generate an image where pixel defects such as blemish defects may be easily detected. Other embodiments may also test image quality and other image enhancement features.

Because color information is not required to execute these routines, the pixel data is converted into luminance and chrominance data prior to processing, e.g., the pixel data is convened from the RGB color space into the YUV color space. The pixel data is converted back into the RGB color space in decoder 140 prior to being transmitted to electronic test system 110. The processed data may therefore be tested by host processor 130 as if it were unprocessed pixel data. Although the processing in processor 135 is performed in the luminance component only (i.e., in the "Y" component), host processor 130 receives the processed data in the RGB domain and processes the pixel data and the processed data in the same way. Processing only the luminance component of the pixel data speeds up processing considerably and enables testing of the image sensor wafer to be performed in two passes without significant costs in testing speed and throughput.

The processed data may be, for example, edge enhanced pixel data, i.e., the processed data may include an edge map of the pixel data identifying the edges (if any) in the pixel data. One of ordinary skill in the art appreciates that if the image sensor wafer is illuminated with uniform light at a given wavelength to produce uniform pixel data, any edges that appear in the processed data may be attributed to pixel defects in the image sensor wafer.

It is also appreciated that processing the pixel data in a second testing pass improves the detection of pixel defects. Some pixel defects, such as small blemish defects, may not be detected in the pixel data generated in the first testing pass, but become easily identifiable in the processed data generated in the second testing pass.

In addition, the improved detection of pixel defects occurs with the addition of processor 135 in interface card 105, without having to modify circuit board 125 or other components of electronic test system 110. This enables more pixel defects to be detected without having to modify currently-available electronic test systems that are already in use in the testing fabrication facilities. Furthermore, by adding processor 135 in interface card 105 enables additional processing routines to be included in processor 135 without modifying the routines in host processor 130. Processor 135 therefore serves as a programmable processor that can be programmed with routines to facilitate the detection of pixel or other defects in image sensor wafer 115 or to aid in the testing of image sensor wafer 115 in general.

It is further appreciated that the placement of processor 135 and decoder 140 on interface card 105 is chosen to minimize the noise on interface card 105 and the testing apparatus in general due to the high data transfer rate required during testing of an image sensor wafer. Because of this concern, processor 135 and decoder 140 are both required to be placed at interface card 105 and not on other components of testing apparatus 100.

According to an embodiment of the invention, image sensor wafer 115 may be illuminated numerous times with light at different wavelengths. The light source may be a multi-wavelength source or a single band light source with the addition of a single-band filter. A common testing approach is to illuminate image sensor wafer 115 with a series of light intensities to generate bright images in bright mode tests, e.g., white images corresponding to pixel DNs of around 150, the middle of the range, and dark images in dark mode tests, e.g. black images corresponding to pixel DNs of around 10. Images producing other pixel DNs, e.g., 127, may also be generated during testing.

Because the second testing pass increases the testing time of image sensor wafer 115 due to the additional processing performed in processor 135, the second testing pass may not have to be performed for each light intensity. In one embodiment, the second testing pass is performed at least once during the bright mode tests and/or at least once during the dark mode tests.

One of ordinary skill in the art appreciates that the dual-pass test approach of the invention may be customized according to the testing speed and throughput requirements of the testing facility. If testing speed and throughput are not a major concern, for example, the first and second testing passes may be both performed for each test conducted on image sensor wafer 115. Conversely, if testing speed and throughput are essential to the testing facility and tests have to be conducted as efficiently as possible, the second testing pass may be performed only occasionally, e.g., once during bright mode tests and/or once during dark mode tests, per image sensor wafer being tested.

Figure 2:
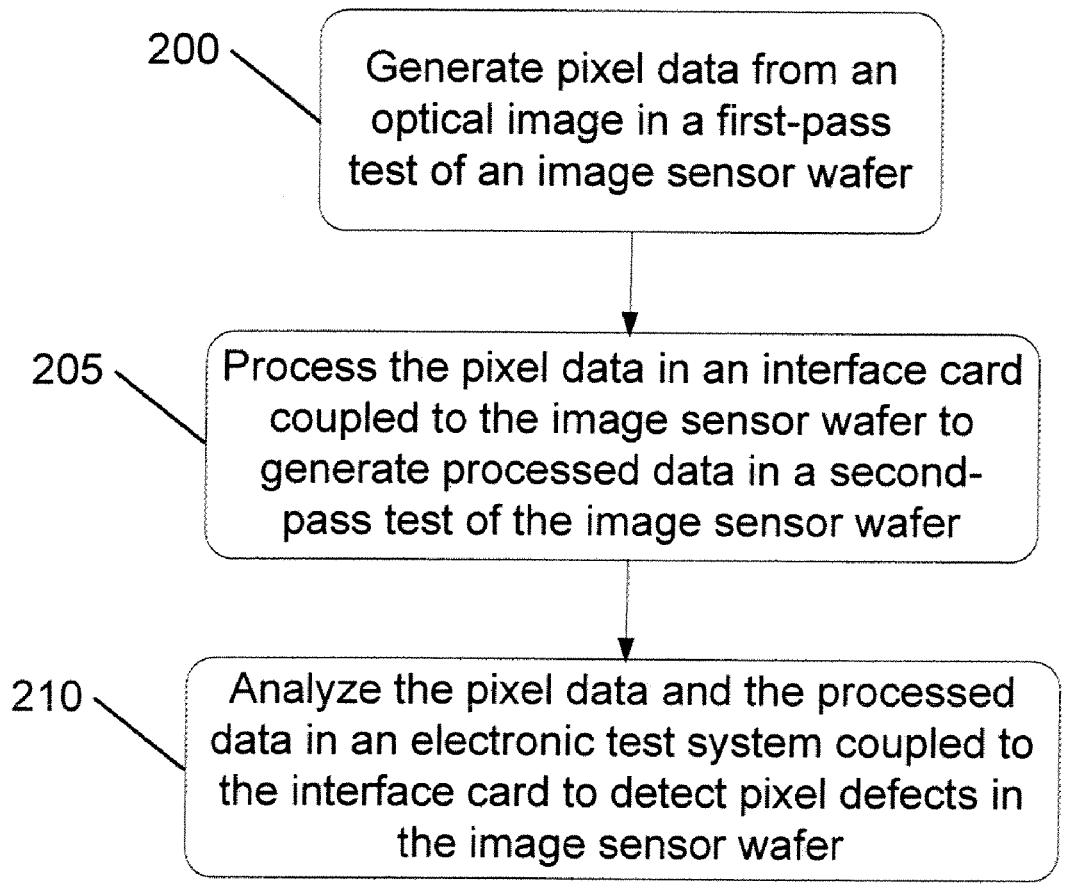
FIG. 2 illustrates a flow chart for conducting a dual-pass test of an image sensor wafer according to an embodiment of the invention.

Referring now to FIG. 2, a flow chart for conducting a dual-pass test of an image sensor wafer according to an embodiment of the invention is described. First, a first pass test of an image sensor wafer is conducted in step 200 to generate pixel data corresponding to an optical image. In one embodiment, the first pass test may be a first pass of a bright mode or a dark mode test, where the image sensor wafer is illuminated with light intensities producing bright and dark images, respectively.

Next, in step 205, a second pass test of an image sensor wafer is conducted for the same light intensity used in the first pass test. The second pass test is conducted as described above with reference to FIG. 1, by processing the pixel data generated by the image sensor wafer in response to the incident light to generate processed data. The processing is performed in a processor built-in in an interface card coupled to an electronic test system, e.g., processor 135 in interface card 105 coupled to electronic test system 110 shown in FIG. 1.

Lastly, in step 210, the pixel data generated during the first pass test and the processed data generated during the second pass test are analyzed by a host processor in the electronic test system, e.g., host processor 130, to determine whether there are pixel defects in the image sensor wafer being tested. In one embodiment, the pixel data is compared to the processed data to identify pixel defects that might not be detected in either pass alone.

As described above, the second pass test may not be performed for all light intensities tested. In this case, the processed data generated during a second pass test of a given light intensity may be analyzed together with the pixel data generated for the same light intensity or with pixel data generated for other light intensities.

Figure 3:
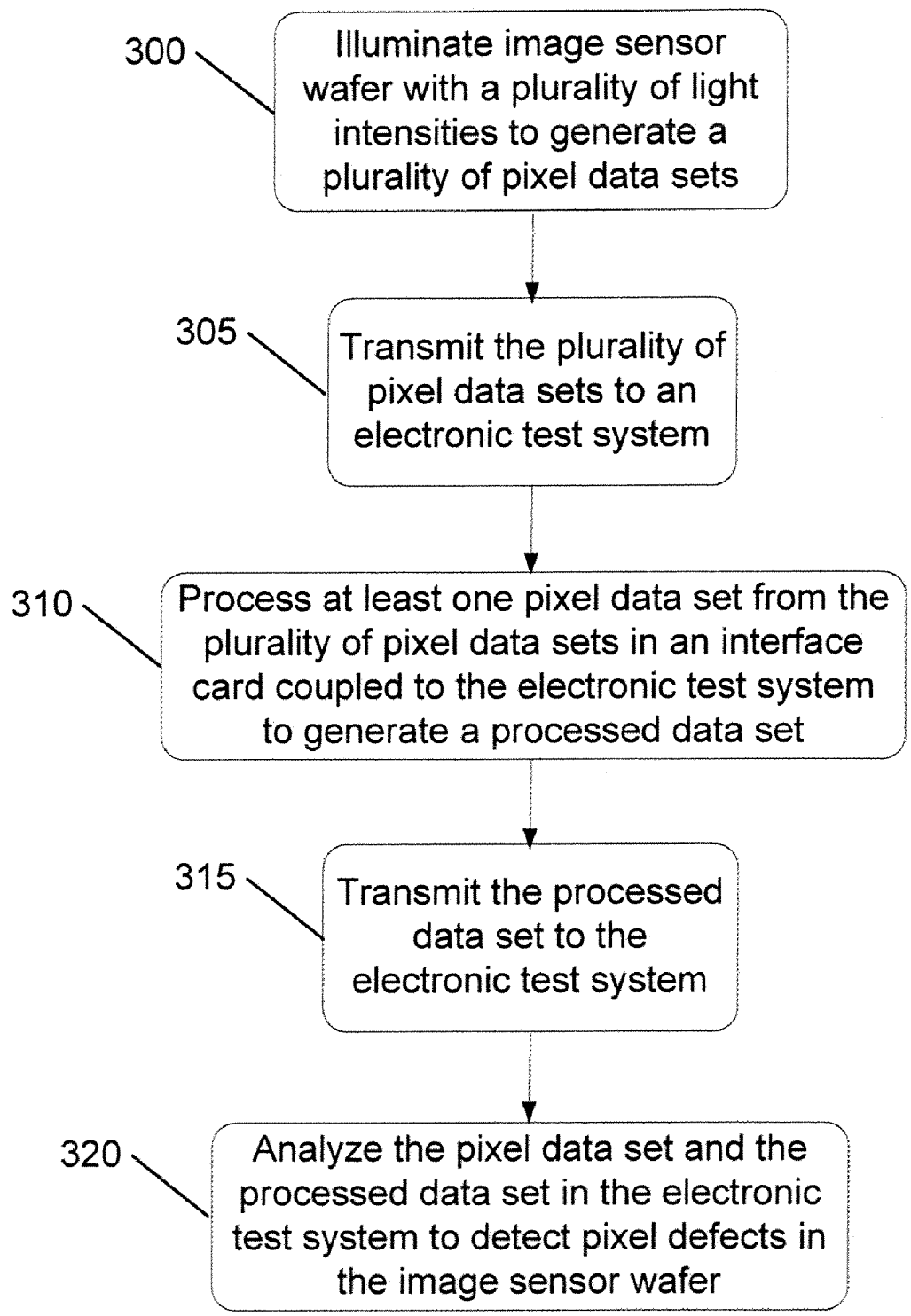
FIG. 3 illustrates a more detailed flow chart for testing an image sensor wafer according to an embodiment of the invention.

A more detailed flow chart for testing an image sensor wafer according to an embodiment of the invention is shown in FIG. 3. First, the image sensor wafer being tested is illuminated with light at a plurality of intensities to generate a plurality of pixel data sets in step 300. Each pixel data set includes pixel data for the entire pixel array of the image sensor wafer. For example, each pixel data set may include 1280×1024 pixels for a 1.3 Mega pixels sensor. The plurality of pixel data sets is then transmitted in step 305 to an electronic test system for analysis in a first pass test of the image sensor wafer.

A second pass test is then performed in step 310 by first processing at least one pixel data set from the plurality of pixel data sets in an interface card coupled to the electronic test system to generate a processed data set as described above. In one embodiment, the interface card includes a built-in processor and a decoder for generating the processed data set, e.g., processor 135 and decoder 140 in interface card 105 shown in FIG. 1. The interface card also includes a switch, e.g., switch 120 in interface card 105, for connecting its built-in processor directly to the image sensor wafer being tested.

The processed data set is then transmitted in step 315 to the electronic test system, e.g., electronic test system 110 shown in FIG. 1. Lastly, the pixel data set and the processed data set are analyzed in the host processor in step 320 to identify pixel defects in the image sensor wafer. For example, the pixel data set and the processed data set are compared to each other to identify any pixel defects that cannot be identified in either the pixel data set or in the processed data set alone, thereby improving the overall detection of pixel defects.

Advantageously, image sensor wafers found to be defective may be discarded prior to being packaged into an image sensor device. A testing fabrication facility employing the testing apparatus of the invention may choose to discard all image sensor wafers having a single defect or adopt a policy that only those image sensor wafers having defects above a certain threshold are to be discarded. The testing fabrication facility may also configure the testing apparatus of the invention as desired to meet a given testing speed and throughput requirement.

In contrast to traditional image sensor testing apparatuses, the image sensor testing apparatus of the invention improves the detection of pixel defects without major sacrifices in testing speed and throughput. Even small blemish defects may be detected, thereby saving the additional costs that are traditionally incurred when image sensor wafers having those defects are packaged into an image sensor device and placed in the marketplace. Additionally, the ability to detect small blemish defects early in the testing process provides an opportunity to automatically exclude the defects via, for example, the use of on-die memory.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. It is intended that the following claims and their equivalents define the scope of the invention.

What is claimed is:

1. An image sensor testing apparatus, comprising:
an electronic test system comprising:
a light source for illuminating an image sensor wafer to generate pixel data; and
a host processor for receiving the pixel data; and
an interface card coupled to the electronic test system and comprising a programmable processor for processing the pixel data to generate processed data, the processed data transmitted to and analyzed by the host processor together with the pixel data to detect pixel defects in the image sensor wafer.

2. The image sensor testing apparatus of claim 1, wherein the interface card further comprises a decoder for decoding the processed data for the electronic test system.

3. The image sensor testing apparatus of claim 1, wherein the electronic test system comprises a circuit board coupled to the interface card.

4. The image sensor testing apparatus of claim 1, wherein the processed data comprises edge enhanced pixel data.

5. The image sensor testing apparatus of claim 1, wherein the host processor comprises image processing routines for processing the pixel data and the processed data to detect pixel defects in the image sensor wafer.

6. The image sensor testing apparatus of claim 5, wherein the image processing routines comprise routines for comparing the pixel data to the processed data to detect pixel defects in the image sensor wafer.

7. The image sensor testing apparatus of claim 1, wherein the interface card comprises a switch configured to connect the image sensor wafer to the programmable processor at least once during a bright mode test and at least once during a dark mode test.

8. A method for conducting a dual-pass test of an image sensor wafer, comprising:
    conducting a first pass test of the image sensor wafer to generate pixel data from an optical image;
    conducting a second pass test of the image sensor wafer to process the pixel data in an interface card coupled to the image sensor wafer to generate processed data; and
    analyzing the pixel data and the processed data in an electronic test system coupled to the interface card to detect pixel defects in the image sensor wafer.

9. The method of claim 8, further comprising decoding the processed data in the interface card for the electronic test system.

10. A method for testing an image sensor wafer, comprising:
    illuminating the image sensor wafer with a plurality of light intensities to generate a plurality of pixel data sets;
    transmitting the plurality of pixel data sets to an electronic test system;
    processing at least one pixel data set from the plurality of pixel data sets in an interface card coupled to the electronic test system to generate a processed data set;
    transmitting the processed data set to the electronic test system; and
    analyzing the at least one pixel data set and the processed data set in the electronic test system to detect pixel defects in the image sensor wafer.

11. The method of claim 10, wherein the processed data set comprises edge enhanced pixel data.

12. The method of claim 11, wherein processing at least one pixel data set from the plurality of pixel data sets comprises processing the at least one pixel data set in a processor mounted to the interface card.

13. The method of claim 11, wherein illuminating the image sensor wafer with a plurality of light intensities comprises conducting a plurality of tests on the image sensor wafer to detect pixel defects in the image sensor wafer.

14. The method of claim 13, wherein the plurality of tests comprises a plurality of bright mode tests and a plurality of dark mode tests.

15. The method of claim 14, wherein processing the at least one pixel data set from the plurality of pixel data sets comprises processing pixel data at least once during the plurality of bright mode tests and at least once during the plurality of dark mode tests.

16. The method of claim 15, wherein analyzing the pixel data set together with the processed data set comprises comparing the pixel data set to the processed data set to detect pixel defects in the image sensor wafer.

17. The method of claim 16, further comprising discarding the image sensor wafer if the number of pixel defects is higher than a predetermined threshold.

18. An interface card for use in an electronic test system for testing an image sensor wafer, comprising:
    a programmable processor comprising image processing routines; and
    a switch for switching between a first and a second testing paths, the first testing path connecting the image sensor wafer directly to the electronic test system to provide pixel data from the image sensor wafer to the electronic test system and the second testing path connecting the image sensor wafer to the processor to provide processed data to the electronic test system.

19. The interface card of claim 18, further comprising a decoder for decoding the processed data for the electronic test system.

20. The interface card of claim 18, wherein the processed data comprises edge enhanced pixel data.

21. The interface card of claim 18, wherein the image processing routines comprise edge enhancement routines.

22. The interface card of claim 18, wherein the interface card is mounted onto a load board in the electronic test system.

23. The interface card of claim 18, wherein the electronic test system comprises a host processor for analyzing the pixel data and the processed data to detect pixel defects in the image sensor wafer.

24. The interface card of claim 23, wherein the host processor comprises routines for comparing the pixel data to the processed data to detect pixel defects in the image sensor wafer.

25. The interface card of claim 24, wherein the image sensor wafer is discarded if the number of pixel defects is higher than a predetermined threshold.

\* \* \* \* \*